United States Patent [19]

Motomura et al.

[11] 4,185,677

[45] Jan. 29, 1980

[54] REINFORCED CONSTRUCTION OF BEAD PORTIONS OF RADIAL TIRES FOR HEAVY LOAD VEHICLES

[75] Inventors: Kenichi Motomura, Higashi-Murayama; Mitsuhisa Yahagi, Sayama; Toshiyuki Sogi, Higashi-Yamato, all of Japan

[73] Assignee: Bridgestone Tire Company Limited, Tokyo, Japan

[21] Appl. No.: 856,068

[22] Filed: Nov. 30, 1977

[30] Foreign Application Priority Data

Mar. 31, 1977 [JP] Japan ................................ 52-36478

[51] Int. Cl.² ............................................ B60C 15/06
[52] U.S. Cl. ............................ 152/362 R; 152/354 R
[58] Field of Search ........... 152/362 R, 362 CS, 354 R, 152/357 R, 356

[56] References Cited

U.S. PATENT DOCUMENTS

| | | | |
|---|---|---|---|
| 3,921,693 | 11/1975 | Suzuki et al. | 152/362 R |
| 3,964,533 | 6/1976 | Arimura et al. | 152/362 R |
| 4,024,901 | 5/1977 | Poque | 152/362 R |
| 4,046,183 | 9/1977 | Takahashi et al. | 152/362 R |

FOREIGN PATENT DOCUMENTS 2013399  10/1971  Fed. Rep. of Germany ...... 152/362 R

*Primary Examiner*—Joseph F. Peters, Jr.
*Assistant Examiner*—D. W. Underwood

*Attorney, Agent, or Firm*—Sughrue, Rothwell, Mion, Zinn & Macpeak

[57] ABSTRACT

A reinforced construction of bead portions of radial tires for heavy load vehicles such as trucks, buses etc., which is well balanced in rigidity and which has an excellent durability is disclosed. The construction includes a first reinforcing layer and a second reinforcing layer, the first reinforcing layer being substantially continuously extended from a height covering both the upper ends of the second reinforcing layer and of the turned-up portion of the carcass ply to the inside surface of the carcass ply, the second reinforcing layer being interposed between the turned-up portion of the carcass ply and the first reinforcing layer, the axially inside portion of said first reinforcing layer which is disposed along the inside of the carcass ply having an upper end whose height $h_1$ from the bead base portion is given by

$$h_1 = (0.8 \text{ to } 2.5)h_0$$

where $h_0$ is a height of the end of the turned-up portion of the carcass ply from the bead base portion and composed of at least two layers whose cords are inclined on a circle formed by the end of the turned-up portion of the carcass ply with respect to the radial direction of the tire by an angle between 40° and 75°, and the axially outside portion of the first reinforcing layer which covers the outside of the second reinforcing layer including at least one layer.

8 Claims, 7 Drawing Figures

FIG. 2
Upper End of Turn-up Portion of Carcass Ply (200% Load)
(Internal Pressure 0.5 Kg/Cm² Standard)

○ Radially Directed Strain
△ Peripherally Directed Strain
× Shearing Strain

Direction of Rotation of Tire

FIG. 3

FIG_5

FIG 6

REINFORCED CONSTRUCTION OF BEAD PORTIONS OF RADIAL TIRES FOR HEAVY LOAD VEHICLES

BACKGROUND OF THE INVENTION

1. Field of the Invention

This invention relates to a reinforced construction of bead portions of radial tires for heavy load vehicles such as trucks, buses etc.

2. Description of the Prior Art

An excellent reinforced construction of bead portions of the above mentioned kind of radial tires has heretofore been proposed, for example, in U.S. Pat. No. 4,046,183. In such prior art construction, a carcass ply composed of radially directed metal cords such as steel cords etc., is wrapped around bead cores from the inside toward the outside thereof to form loops and turned-up portions, respectively. These loops and turned-up portions are secured to bead portions. On the outside of the turned-up portion are laid in bias at least two organic fiber cord layers formed of nylon etc. Between these two organic cord layers is interposed at least one metal cord layer formed of steel etc., the metal cord being inclined to and crossed with respect to a radially directed surface of the tire.

The tire constructed as above described has been favorably accepted by drivers as a tire which can be used under severe and heavy load condition. Recently, some drivers have begun to use such tires under more even severe conditions due to economic conditions such that as a result, bead separation failure is sometimes induced. On the one hand, in order to substantially reduce the cost of tires, the rate of using a steel cord radial tire as a recapped tire has increased. It has become the present tendency to recap a worn tire two or three times. Under such circumstances, it is vigorously desired to eliminate bead separation failure which is vital to preserving a base tire, and hence it is desirable to provide a highly durable reinforced bead construction.

SUMMARY OF THE INVENTION

An object of the invention, therefore, is to provide a highly durable reinforced construction of bead portions of radial tires for heavy load vehicles, which can eliminate the difficult problem which has been encountered with the prior art techniques, that is, which are resistant use under very heavy load conditions and which can be recapped two or three times without damaging the base tire.

DETAILED DESCRIPTION OF THE INVENTION

Radial and semi-radial tires have a carcass ply composed of radially directed cords. As a result, the side wall of the radial tire is extremely soft and hence its flexure in a plane inclusive of a rotary axis of the tire is very large. Thus, the amount of deformation of the tire during one revolution is far larger than that of a bias laid tire.

Figure 1A:
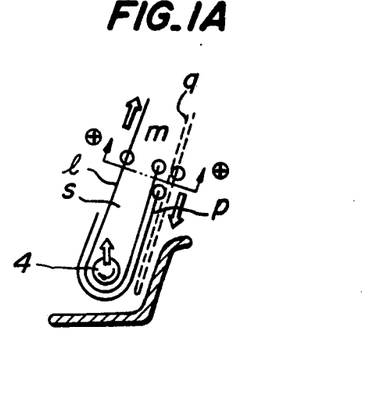
FIG. 1A is a schematic diagram of a bead portion of a radial tire.

In FIG. 1A is shown a bead portion of a radial tire. As shown in FIG. 1A, when the tire is inflated, a carcass ply l located inside the center of a bead core 4 moves upwardly as shown by an arrow and a carcass ply m located outside the center of the bead core 4 moves downwardly as shown by an arrow, thus tending to disengage the carcass ply from the bead core 4. The outside carcass ply m causes a metal core reinforcing layer p and an organic fiber cord reinforcing layer q to move downwardly.

Figure 1B:
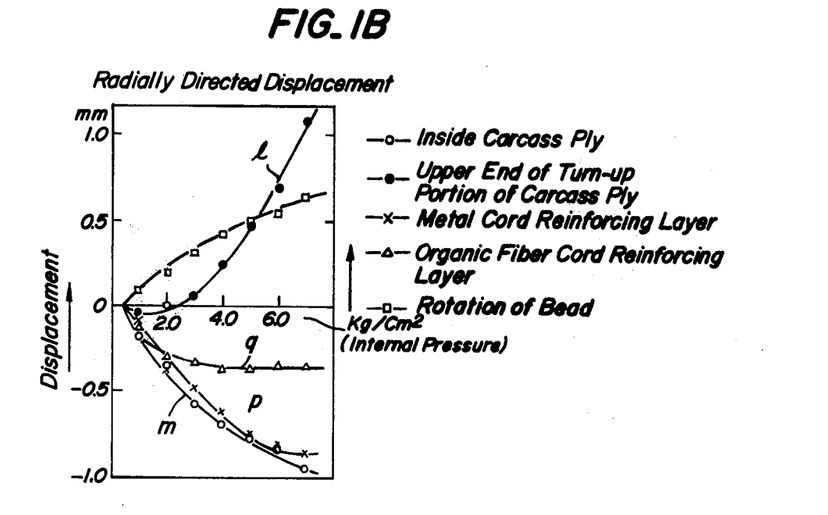
FIG. 1B is a graph showing a displacement of a tire bead portion and rotating angle of a bead core as a function of internal pressure when the tire is inflated.

In FIG. 1B is shown the amount of displacement of l, m, p and q. As shown in FIG. 1B, the amount of displacement of l, m, p and q is given by $$l = m > p > q$$

In addition, the deformation of the tire when it is inflated causes a shearing strain to be produced in a stiffener s.

When the tire is rotated under load, the carcass ply is repeatedly raised and lowered in a well-bucket manner about the bead core 4 producing a dynamic strain. This dynamic strain becomes increased as the temperature of the carcass ply is raised.

Figure 2:
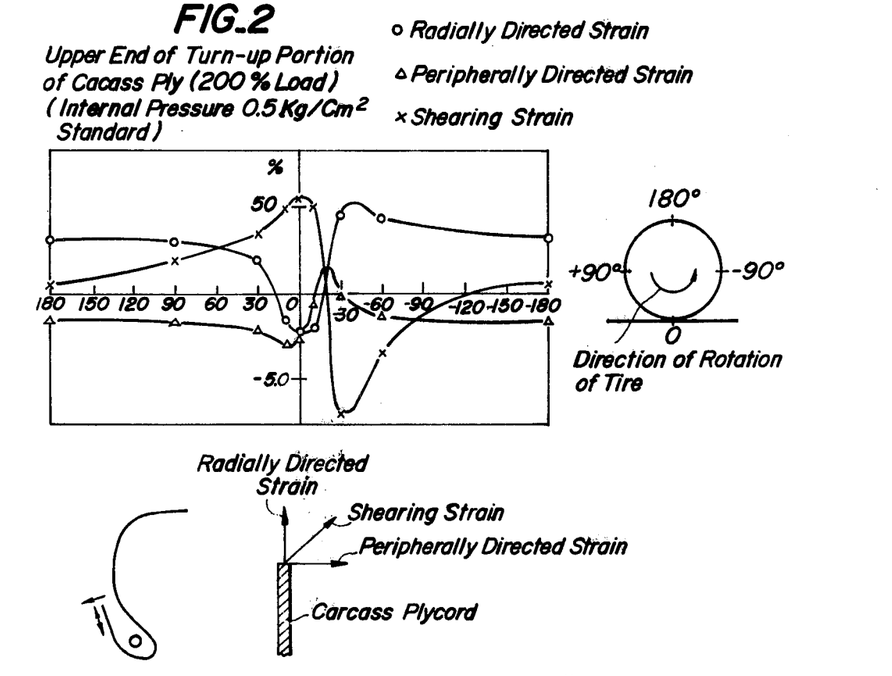
FIG. 2 is a graph showing radially directed strain, peripherally directed strain and shearing strain produced at the upper end of a turned-up portion of a carcass ply of a tire in use.

In FIG. 2 is shown a graph of experimental test results showing radially directed strain, peripherally directed strain and shearing strains produced at the upper end of the turned-up portion of the carcass ply when the tire is inflated by an internal pressure of 0.5 kg/cm$^2$ and subjected to 200% load as a function of the rotary angle of the tire and measured by the strain gauge method.

The experimental tests were effected by a testing machine specially designed for the purpose of recapping a worn tire. Changes in strains at the upper end of the turned-up portion of the carcass ply shown in FIG. 2 were produced when the tire was subjected to a load of 5.4 t which is equal to 200% load as defined by JIS. The tire was then rotated.

In the graph shown in FIG. 2, the ordinate shows strain in % produced at the upper end of the turned-up portion of the carcass ply and the abscissa shows the position of the strain gauge in degrees, the angle directly below the load being defined by 0°.

Plus values plotted on the ordinate show tensile strain, while minus values plotted on the ordinate show compressive strain. Plus values plotted on the abscissa show those on a step-in side of the tire being tested, while minus values plotted on the abscissa show those on a kick-out side of the tire being tested.

The measurement was effected under such condition that the tire was rotated at a constant speed. As a result, a waveform of the strain produced directly below the load is not always symmetrical with respect to the point 0, but in general, the waveform of the strain is in the form of an odd functional curve. That is, the carcass ply cord is raised and lowered about the bead core in the well-bucket manner. This phenomenon will hereinafter be called the "well-bucket effect" for the sake of convenience.

In addition, the bead portion falls sideways toward the outside of the tire in the axial direction thereof, and as a result, the bead portion becomes more deformed than it does from the deformation caused by the shearing strain of the stiffener produced when the tire is inflated and subjected to the load. On the one hand, the separation of the distance between adjacent two carcass ply cords and the falling sideways action of the bead portion causes the metal cord reinforcing layer to change its angle of inclination. As a result, the stress is concentrated into the upper end of the turned-up portion of the carcass ply and the upper end of the radially directed metal cord reinforcing layer. Such stress, concentrated into the upper end of the metal cord whose modulus of elasticity is quite different from that of rubber, tends to induce the tire failure.

The inventors have found the mode of the above mentioned displacement of the bead portion of the pneumatic tire comprising the radial or semi-radial carcass ply. The invention is based on the inventors' recognition and provides a pneumatic tire which is provided with bead portions, which is well balanced in rigidity, and which has an excellent durability.

A feature of the invention is the provision in a pneumatic tire comprising at least one carcass ply wrapped around bead cores from the inside toward the outside thereof to form loops and turned-up portions, respectively, and having radially or semi-radially directed cords, a rubber stiffener interposed between the carcass ply and its turn-up portion and extending radially outwardly from the bead core, said rubber stiffener being substantially triangular in section, the improved reinforced construction of bead portions of radial tires for heavy load vehicles, comprising a first reinforcing layer and a second reinforcing layer, said first reinforcing layer being substantially continuously extended from an axially outward point higher than both the upper end of said second reinforcing layer and the end of the turned-up portion of the carcass ply through the lower side surface of the loop portion of said carcass ply to an axially inner point adjacent the inner surface of the non-turned-up portion of said carcass ply, said said second reinforcing layer being interposed between the turned-up portion of the carcass ply and said first reinforcing layer, the axially inside portion of said first reinforcing layer which is disposed along the inside of the carcass ply having an upper end whose height $h_1$ from the bead base portion is given by $$h_1 = (0.8 \text{ to } 2.5)h_0$$

where $h_0$ is a height of the end of the turned-up portion of the carcass ply from the bead base portion and composed of at least two layers whose cords are inclined relative to a circle formed by the end of the turned-up portion of the carcass ply with respect to the radial direction of the tire by an angle between 40° and 75°, and the axially outside portion of said first reinforcing layer which covers the outside of the second reinforcing layer being composed of at least one layer.

Heretofore, it has been proposed to reinforce bead portions by means of a reinforcing element such as an organic fiber cord chafer, metal cord chafer or rubber stiffener etc., or by means of a combination of these reinforcing elements. The invention provides an improved reinforced construction of bead portions of radial tires for heavy load vehicles in which these reinforcing elements are arranged in a balanced state.

In accordance with the invention, in order to reduce the stress concentrated into the upper end of the metal cords which constitute the second reinforcing layer or the upper end of the turn-up portion of the carcass ply cords, the bead portions are reinforced such that the deformation of the bead portions is effectively suppressed and both the removal of the carcass ply from the bead cores and the "well-bucket effect" of the carcass ply are alleviated, that the organic fiber cord first reinforcing layer which can effectively resist against tensile force is wrapped around the bead core, that the metal cord second reinforcing layer having a high bending rigidity is disposed on the axially outside of the turned-up portion of the carcass ply and interposed between the turn-up portion of the carcass ply and the organic fiber cord first reinforcing layer, and that the stiffener is interposed between the carcass ply and its turned-up portion.

As the organic fiber cord first reinforcing layer is substantially continuously wrapped around the bead core extending from the axially outside portion of the bead through the lower side surface of the loop portion of the carcass ply to the axially inside portion of the bead so that it functions with the aid of the metal cord second reinforcing layer to prevent the separation of the carcass ply from the bead core when the carcass ply is subjected to tensile force, it suppress the separation movement between two adjacent cords and the well-bucket effect of the carcass ply when the tire is subjected to repeating load thus preventing the bead portion from being damaged.

The metal cord second reinforcing layer, which is interposed between the turned-up portion of the carcass ply and the organic fiber cord first reinforcing layer, is constructed of cords which are inclined on a circle formed by the end of the turned-up portion of the carcass ply with respect to the radial direction of the tire by an angle between 45° and 80°, preferably 50° and 65°. It is preferable to locate the upper end of the second reinforcing layer at a position which is lower than the end of the turned-up portion of the carcass ply for the purpose of improving the durability of the bead portions.

The cords of at least two layers of the organic fiber cord first reinforcing layer cross each other at the axially inside of the carcass ply.

Figure 3:
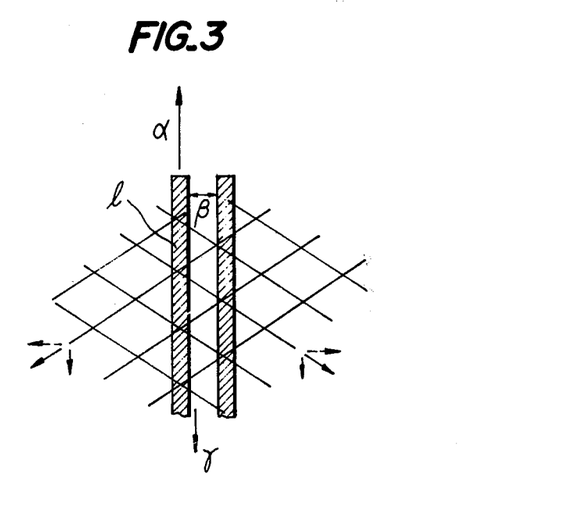
FIG. 3 is a schematic diagram illustrating the principle of a bead reinforcing effect.

In FIG. 3 is illustrated the bead reinforcing effect. As shown in FIG. 3, the invention makes use of a combination of various kinds of reinforcing elements for the purpose of effectively suppressing the tensile force $\alpha$ subjected to the carcass ply 1, the separation movement $\beta$ subjected to two adjacent carcass plies 1, 1 and the "separation movement" or "well-bucket movement" $\gamma$ of the carcass ply 1 produced when the tire is inflated or the tire is driven over ground under load. If the organic fiber cord first reinforcing layer is disposed outside the metal cord second reinforcing layer, the use of only one organic fiber cord first reinforcing layer ensures a high reinforcing effect.

Figure 4:
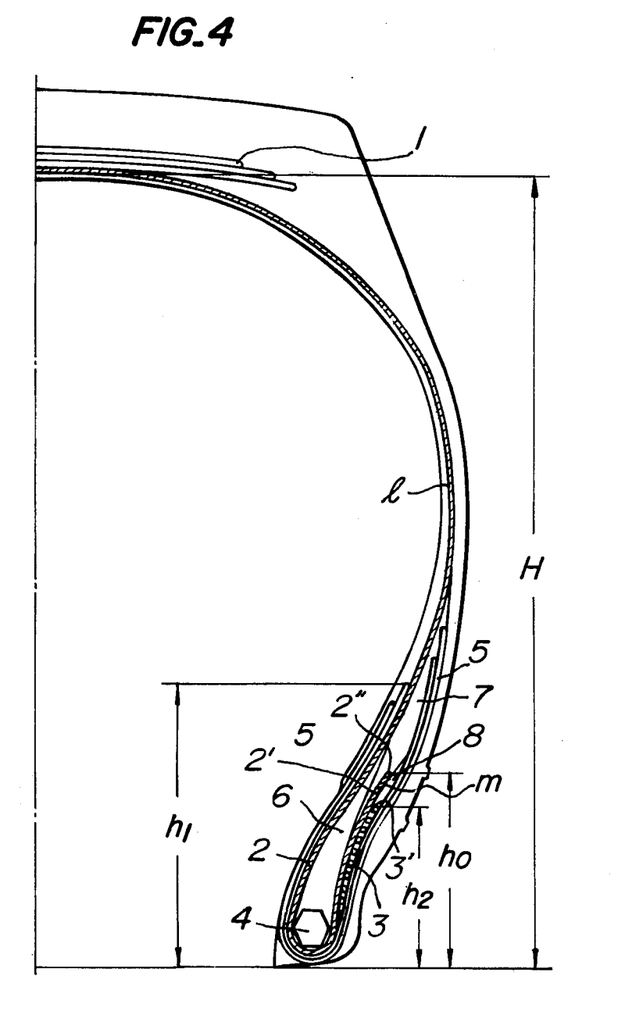
FIG. 4 is a sectional view of one embodiment of a radial tire according to the invention.

In FIG. 4 is shown one embodiment of a tire according to the invention. After elaborate experimental tests and investigations, the inventors recognized that a height $h_1$ of the upper end of a organic fiber cord first reinforcing layer 5 located at the axially inside of a carcass ply 2 from the bead base portion functions to exert a considerably large influence upon stress concentration at the upper end 3' of a metal cord second reinforcing layer 3. That is, if the height $h_1$ exceeds 0.8 $h_0$, the stress concentration at the upper end 3' of the metal cord of the second reinforcing layer 3 is suddenly reduced, particularly main shearing strain at the end of the turned-up portion of the carcass ply is reduced. On the contrary, if the height $h_1$ is made extremely high, the upper end of the organic fiber cord first reinforcing layer 5 gets near the flex zone of the tire and the upper end of the organic fiber cord first reinforcing layer 5 tends to induce crack failure. It is, therefore, necessary to determine the height $h_1$ to a range given by $$h_1 = (0.8 \text{ to } 2.5)h_0,$$

preferably, a range given by $$h_1 = (1.0 \text{ to } 2.0)h_0,$$

the upper limit being not exceeding a height of the maximum width of the tire section.

The arrangement of the organic fiber cord first reinforcing layer 5 in the above mentioned range ensures a significant reduction of a separation failure at the end 2" of the turned-up portion 2' of the carcass ply 2 and at the upper end 3' of the metal cord second reinforcing layer 3.

The coating rubber of the organic fiber cord first reinforcing layer 5 has a low 100% modulus of elasticity of 45 to 65 kg/cm$^2$, preferably 50 to 60 kg/cm$^2$, which is higher than that of rubber for the conventional organic fiber cord reinforcing element.

The coating rubber of the metal cord second reinforcing layer 3 has a high 100% modulus of elasticity of 45 to 80 kg/cm$^2$, preferably 50 to 80 kg/cm$^2$. The cords of the organic fiber cord first reinforcing layer 5 are inclined on a circle formed by the end 2" of the turned-up portion 2' of the carcass ply 2 with respect to the radial direction of the tire by an angle between 40° and 75°. Such range of the inclined angle is extremely effective.

The organic fiber cord first reinforcing layers 5 are arranged so as to cover the end 2" of the turned-up portion 2' of the carcass ply 2 and also cover the upper end 3' of the metal cord second reinforcing layer 3. The height of the upper end of the organic fiber cord first reinforcing layers disposed axially outside the bead core 4 is made equal to, preferably higher than the height $h_1$ of the upper end thereof disposed axially inside the bead core 4. The invention is not limited to such arrangement of the organic fiber cord first reinforcing layers 5. But, such construction can alleviate the extremely large stepped difference in rigidity of the reinforcing elements for the bead portions.

The stiffener may be formed of one integral rubber piece or formed of a composite rubber body composed of upper and lower halves 7, 6. It is preferable to make the 100% modulus of elasticity of the upper half rubber 7 lower than that of the lower half rubber 6 adjacent to the bead core 4. It is more preferable to make the upper end 3' of the radially directed metal cord second reinforcing layer 3 or the end 2" of the turned-up portion 2' of the carcass ply 2 in contact with the stiffener 7 having a low modulus of elasiticity. A combination of such arrangement of the stiffener and the arrangement of the reinforcing element according to the invention maintains the rigidity of the tire in balance, and hence is more preferable.

Figure 5:
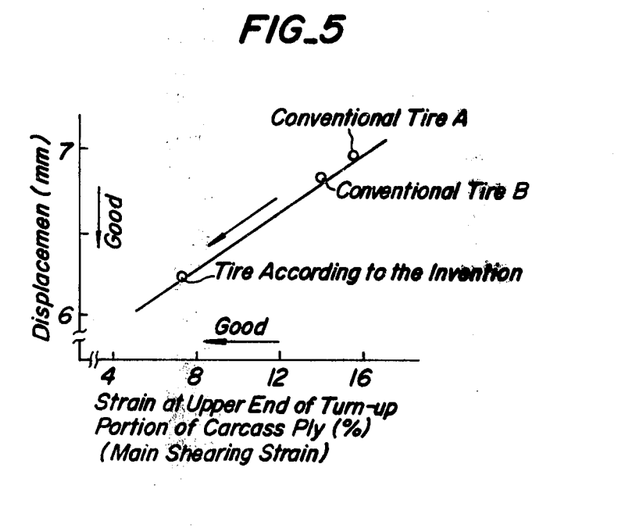
FIG. 5 is a graph showing test results of conventional tires and tires constructed according to the invention.

In FIG. 5 is shown a laboratory test result of the tire according to the invention as compared with those of the conventional tires. As seen from FIG. 5, the tire according to the invention is capable of significantly reducing both the displacement and the strain (main shearing strain) produced at the end 2" of the turn-up portion 2' of the carcass ply 2. In FIG. 5, the displacement of the end 2" of the turn-up portion 2' of the carcass ply 2 is plotted in mm on the ordinate, while strain (main shearing strain) thereof is plotted in % on the abscissa.

In each of conventional tires A, B, a radial carcass ply formed of metal cords is wrapped around bead cores from the inside to the outside thereof and secured thereto to form turned-up portion. On the axially outside only of the turned-up portion of the carcass ply are disposed two bias laid organic fiber cord layers formed of nylon cord etc. Between the turned-up portion of the carcass ply and the organic fiber cord layers is interposed one metal cord reinforcing layer which is composed of a ply of inclined cords. In the conventional tire A, the upper end of the radially directed metal cord reinforcing layer is located above the end of the turned-up portion of the carcass ply, while in the conventional tire B, the upper end of the radially directed metal cord reinforcing layer is located below the upper end of the turned-up portion of the carcass ply.

In addition, drum tests have yielded the result that the temperature of bead portion measured at the end 2" of the turned-up portion 2' of the carcass ply 2 of the tire according to the invention is lower than that of the conventional tire B by 20° C. This is because of the fact that the bead portion of the tire according to the invention is subjected to less deformation which causes the bead portion rubber such as the stiffener rubber (polymer rubber) to move only a little.

In FIG. 4 is shown in section a right half of one embodiment of a radial tire according to the invention and having a size of TBR 1000 R 20 14PR.

Referring to FIG. 4, a belt 1 is of general construction and composed of metal cords. The carcass ply 2 is composed of radially directed steel cords extending from one of bead cores 4 to the other bead core (not shown) and wrapped around each bead core 4 from the inside to the outside thereof and secured thereto. A height $h_0$ of the end 2" of the turned-up portion 2' of the carcass ply 2 measured from the bead base portion is given by $$h_0 = (0.13 \text{ to } 0.35)H$$

where H is a height of the carcass 2 measured from the bead base portion. In the present embodiment, H=240 mm and $h_0$ is 63 mm, that is, $h_0 \approx 0.26H$.

Figure 6:
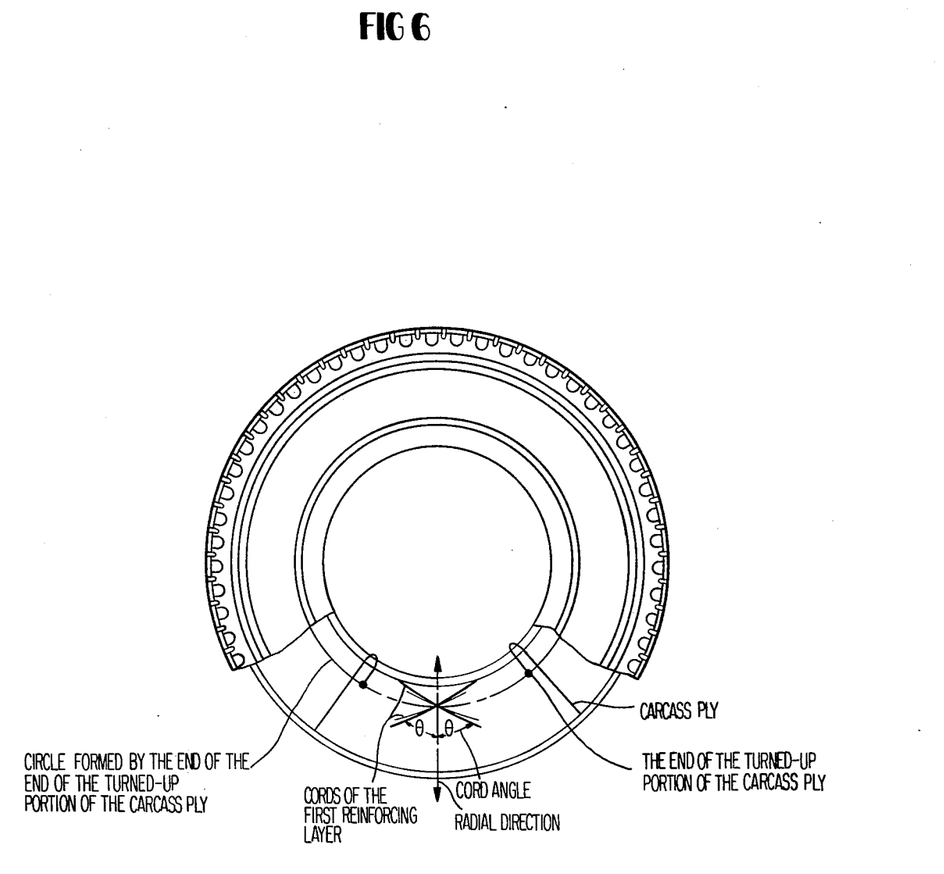
FIG. 6 is a schematic diagram of the cords of the first reinforcing layer.

The organic fiber cord first reinforcing layer 5 is constructed of nylon cords. Two layers 5, 5 extend downwardly from a position which is sufficiently high that the two layers 5, 5 cover the end of the turned-up portion 2' of the carcass 2 and are wrapped around the bead core 4 and then extend upwardly along the axially inside of the carcass ply 2. The cords of the axially inside reinforcing layer 5 are inclined to the cords of the radially directed carcass ply 2 by 56° and the cords of the axially outside reinforcing layer 5 are inclined to the cords of the radially directed carcass ply 2 by 66°. As a result, the cords of the inside and outside reinforcing layers 5, 5 cross each other. The coating rubber of the first reinforcing layers 5, 5 has a 100% modulus of elasticity of 58 kg/cm². The height $h_1$ of the upper end of the inside first reinforcing layer 5 is given by $$h_1 = 95 \text{ mm}$$

which satisfies the following condition $$h_1 \approx 1.5 h_0.$$

The axially inside and outside organic fiber cord first reinforcing layers 5, 5 are jointed together at the bead base portion. With such a joining method, it is preferable to use a butt joint or overlay joint. In this case, it is sufficient to secure each of these reinforcing layers 5, 5 to the bead core 4. These reinforcing layers 5, 5 may be separated from the joint portion.

A hard stiffener 6 having 100% modulus of elasticity of 105 kg/cm² is disposed on the bead core 4 and a soft stiffener 7 having 100% modulus of elasticity of 20 kg/cm² is disposed on the stiffener 6. The stiffeners 6, 7 as a whole are triangular in section. The end 2″ of the turned-up portion 2′ of the carcass ply 2 is positioned adjacent to the soft stiffener 7.

The 100% modulus of elasticity of the hard stiffener 6 is selected to be at least 70 kg/cm², preferably within a range of between 80 kg/cm² and 115 kg/cm². The 100% modulus of elasticity of the soft stiffener 7 is selected to a range between 15 kg/cm² and 50 kg/cm², preferably between 20 kg/cm² and 30 kg/cm². It is preferable that the stiffener has, as a whole, a height given by a range of (0.3 to 0.6) H.

The second reinforcing layer 3, constructed of steel cords is located at the axially outside of the turned-up portion 2′ of the carcass ply 2 and interposed between the turned-up portion 2′ of the carcass ply 2 and the nylon cord first reinforcing layer 5. The upper end of the steel cord second reinforcing layer 3 is made lower than the end 2″ of the turned-up portion 2′ of the carcass ply 2. The steel cord second reinforcing layer 3 is secured axially to the outside of the bead core 4 in the region of the bead heel portion. The steel cord second reinforcing layer 3 may be wrapped around the bead core 4 axially inwardly. The cords of the steel cord second reinforcing layer 3 are inclined to the radially directed ply cords by an acute angle and to the radial direction of the tire by an angle of 62°. The coating rubber of the steel cord second reinforcing layer 3 has a 100% modulus of elasticity of 65 kg/cm². The upper end 3′ of the steel cord second reinforcing layer 3 has a height $h_2$ from the bead base portion of about 53 mm which is equal to about 0.84 $h_0$.

The upper end 3′ of the steel cord second reinforcing layer 3 may be made higher than the end 2″ of the turned-up portion 2′ of the carcass ply 2, but may preferably be made lower than the latter and located at a position given by (3/5 to 7/5) $h_0$, preferably 3/5 $h_0$.

In FIG. 4, reference numeral 8 designates an end cover rubber located adjacent to both the end 2″ of the turned-up portion 2′ of the carcass ply 2 and the upper end 3′ of the metal cord second reinforcing layer 3 and having a 100% modulus of elasticity of 65 kg/cm².

Drum endurance tests have yielded the result that the above mentioned conventional tire B runs for a distance of 18,500 km without occurring any damage thereto, while the tire according to the invention runs for a distance of 29,000 km without occurring any damage thereto. This test result shows that the durability of the tire according to the invention can be improved more than about ⅓ relative to the conventional tire B.

In addition, practical tests have demonstrated that the bead portions of the tire according to the invention exhibit an excellent durability so that less failure occurs even after many hours of intermittent and continuous use of the tire under severe conditions.

What is claimed is:

1. In a pneumatic tire comprising at least one carcass ply wrapped around bead cores from the inside toward the outside thereof to form loops and turned-up portions, respectively, and composed of radially or semi-radially directed cords, a rubber stiffener interposed between the carcass ply and its turned-up portion and extending radially outwardly from the bead core, said rubber stiffener being substantially triangular in section, the improved reinforced construction of bead portions of radial tires for heavy load vehicles, comprising a first reinforcing layer composed or organic fiber cords and a second reinforcing layer composed of metal cords, said first reinforcing layer being substantially continuously extended from an axially outward point higher than both the upper end of said second reinforcing layer and the end of the turned-up portion of the carcass ply through the lower side surface of the loop portion of said carcass ply to an axially inner point adjacent the inner surface of the portion of said carcass ply not turned up, said second reinforcing layer being interposed between the turned-up portion of the carcass ply and said first reinforcing layer, the axially inside portion of said first reinforcing layer which is disposed along the inside of the carcass ply having an upper end whose height $h_1$ from the bead base portion is given by $$h_1 = (0.8 \text{ to } 2.5)h_0$$

where $h_0$ is a height of the end of the turned-up portion of the carcass ply from the bead base portion and having at least two layers whose cords cross with one another and are inclined on a circle formed by the end of the turned-up portion of the carcass ply with respect to the radial direction of the tire by an angle between 40° and 75°, and the axially outside portion of said first reinforcing layer which covers the outside of the second reinforcing layer being composed of at least one layer wherein said second reinforcing layer extends radially inwardly and is terminated at a lower end in the region of the bead heel portion so as to be secured axially outside of the bead core.

2. The reinforced construction of bead portions according to claim 1, wherein said stiffener is composed of a composite rubber stock consisting of a upper half portion and a lower half portion disposed adjacent to the bead core, said upper half portion having a modulus of elasticity which is lower than that of the lower half portion.

3. The reinforced construction of bead portions according to claim 1, wherein said height $h_1$ of the upper end of the axially inside portion of said first reinforcing layer which is disposed along the inside of the carcass ply from the bead base portion is given by $$h_1 = (1 \text{ to } 2.0)h_0$$

where $h_0$ is a height of the end of the turn-up portion of the carcass ply from the bead base portion.

4. The reinforced construction of bead portions according to claim 1, wherein a coating rubber of said first reinforcing layer has a 100% modulus of elasticity of 45 to 65 kg/cm².

5. The reinforced construction of bead portions according to claim 2, wherein said lower half portion of said stiffener has a 100% modulus of elasticity of at least 70 kg/cm² and said upper half portion of said stiffener has a 100% modulus of elasticity of 15 to 50 kg/cm².

6. The reinforced construction of bead portions according to claim 1, wherein said second reinforcing layer extends radially outwardly and is terminated at an upper end having a height $h_2$ from the bead base portion, said height $h_2$ being lower than said height $h_0$ of the end of the turned-up portion of the carcass ply from the bead base portion and lying within a range given by $$h_0 > h_2 > 3/5 h_0.$$

7. The reinforced construction of bead portions according to claim 1, wherein cords of said second reinforcing layer or extensions thereof are inclined on a circle formed by the end of the turned-up portion of the carcass ply with respect to the radial direction of the tire by an angle between 45° and 80°.

8. The reinforced construction of bead portions according to claim 1, wherein a coating rubber of said second reinforcing layer has a 100% modulus of elasticity of 45 to 80 kg/cm².

* * * * *